UNITED STATES PATENT OFFICE.

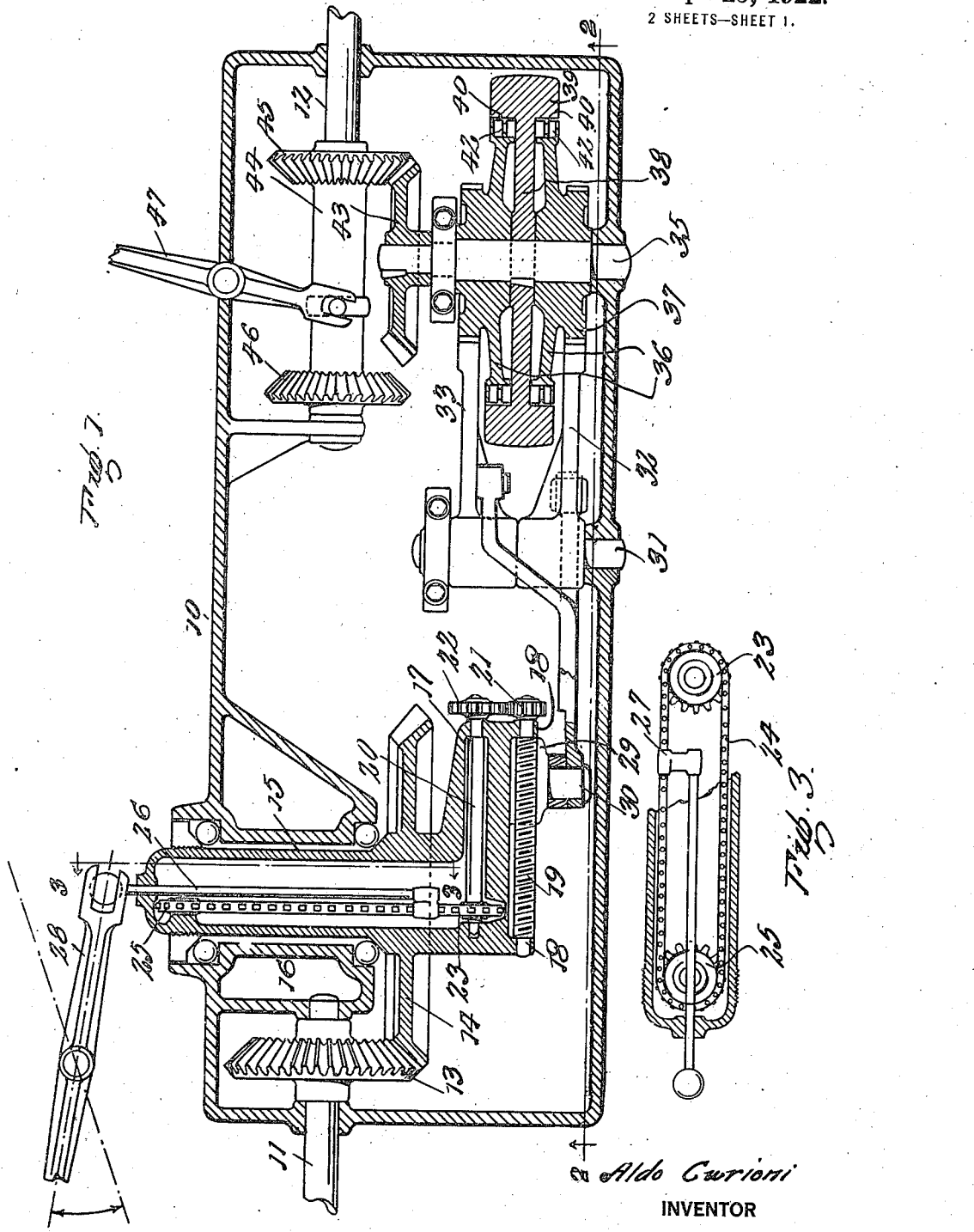

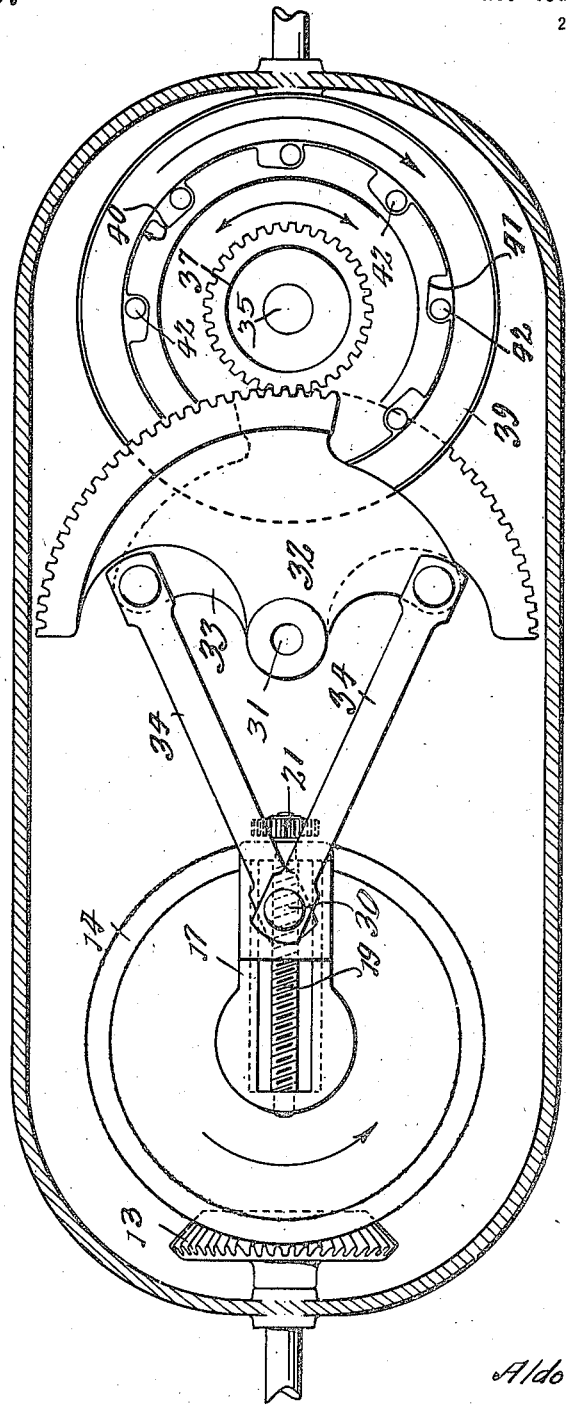

ALDO CURIONI, OF BROOKLYN, NEW YORK, ASSIGNOR OF ONE-HALF TO JOS. ARMIERI & CO., OF BROOKLYN, NEW YORK, A PARTNERSHIP CONSISTING OF JOS. C. ARMIERI, JENNIE ARMIERI, LUCY ARMIERI, CONCETTA ARMIERI, RALPH MARINO, JOS. ARMIERI, LOUIS GUASTELLA, JOHN ARMIERI, AND JOS. S. ARMIERI.

TRANSMISSION MECHANISM.

1,413,970.  Specification of Letters Patent.  Patented Apr. 25, 1922.

Application filed February 3, 1920. Serial No. 356,077.

*To all whom it may concern:*

Be it known that I, ALDO CURIONI, a subject of King of Italy, residing at Brooklyn, in the county of Kings and State of New York, have invented certain new and useful Improvements in Transmission Mechanisms, of which the following is a specification.

This invention has relation to transmission mechanisms for transmitting power from one element to the other and for varying the rate of transmission.

Another object of the invention is to provide a transmission mechanism designed primarily for automobiles and including a means for converting rotary movement of the engine crank shaft into a reciprocatory motion, for varying the degree of travel of the reciprocating element, and finally for reconverting the reciprocatory motion into rotary motion, in this manner permitting a variation of ratio of rotation between the driving and driven elements for the purpose set forth.

In addition to the foregoing this invention comprehends improvements in the details of construction and arrangement of parts to be hereinafter described and particularly set forth in the appended claims.

In the accompanying drawings in which similar and corresponding parts are designated by the same characters of references throughout the several views in which they appear.

Figure 1 is a view in horizontal section of a transmission mechanism constructed in accordance with my invention.

Figure 2 is a view in section taken on the line 2—2 of Figure 1, and

Figure 3 is a detail section taken on the line 3—3 of Figure 1.

With reference to the drawings, 10 indicates a casing having the driving shaft 11 entering therein at one end and journaled for rotation, and the driven shaft 12 similarly mounted in the opposite end. A bevel gear 13 is mounted upon the driving shaft and is in meshing engagement with the relatively large bevel gear 14, the latter carrying a hollow central extension or casing 15 which is mounted for rotation upon ball bearings enclosed within a cage 16, the latter being formed integrally with the casing 10.

The bevel gear 14 carries at its opposite side a radial integrally formed extension 17 opened interiorly and in communication with the interior of the extension 15 and provided at opposite ends with bearings 18 in which a screw shaft 19 is journaled. A shaft 20, parallel to the shaft 19 is mounted within the radial extension 17 for rotation, and the shafts 19 and 20 are connected together by pinions 21 and 22 mounted on the shafts 19 and 20 respectively and in meshing engagement. The opposite end of the shaft 20 interiorly of the casing 15 carries a sprocket wheel 23 around which a chain 24 passes, said chain also passing around a sprocket wheel 25 mounted within the extension 15 at the opposite end thereof. A rod 26 is slidably mounted in the extension 15 and is connected by means of a clip 27 at its inner end with the chain 24. A lever 28 is mounted and connected at one end with the outer end of the rod 26 so that the latter may be shifted to correspondingly shift the chain 24 and thus rotate the sprockets 23 and 25 in unison, motion of the sprocket 23 being communicated through the shaft 20 to the pinions 21 and 22 and thence to the threaded shaft 19 rotating the latter. A nut 29 is threadedly embraced about the shaft 19 and carries a pin 30. A stub-shaft 31 is mounted in the casing and extended inwardly thereof and carries a pair of two sectors 32 and 33. A pair of pitmen rods 34 are provided, one end of each being pivotally mounted upon the pin 30 and the opposite end of one pivotally connected to the sector 32 and the corresponding end of the other pitmen pivotally connected to the sector 33 as shown in Figure 2. A stub-shaft 35 is mounted for rotation in the casing and extended transversally thereof and carries a pair of discs 36 loosely mounted upon the shaft, each disc having integrally formed therewith a spur gear 37, one of which meshes with the sector 32 and the other with the sector 33. Located between the discs 36 is a fly wheel having a thin septum or central portion 38 and a heavy periphery 39 defining a pair of inner peripheral surfaces 40. Each disc 36 is formed upon its periphery with a plurality of recesses 41 one end of each recess being radial, the opposite end being semi-circular and the surface between the ends being straight and tangential, thus making each recess deeper at one end than at the other. Contained within each recess is a roller 42. The shaft 35 carries a bevel gear 43 and mounted upon the shaft 12 for sliding or splined movement is a sleeve 44 carrying a bevel gear 45 and 46 at each end. The sleeve 44 may be shifted longitudinally by means of the lever 47 so that either gear 45 or 46 may be brought into engagement with the bevel gear 43.

In operation, rotation of the drive shaft 11 is communicated through the bevel gear 13 to the bevel gear 14 rotating the latter which carries the radial extension in the circular path. If the nut 29 is adjacent the outer end of the radial extension 17 it will be obvious that rotation of said extension and consequently of pin 30 is converted to a reciprocatory motion of the pitman rods 34, the motion of the latter being in turn converted to rotary motion of the sectors 32 and 33, the latter however operating in a rotary oscillatory manner. Rotation of the sectors is communicated to the pinions 37 which are rotated each a few revolutions first to one direction and then in the other. However, owing to the fact that during rotation of the discs 36 thus produced in one direction the rollers 42 will rotate freely within their recesses, but rotation of the disc in an opposite direction will cause the rollers to bind at the narrow end of the recess 41 and thus engage the inner surface 40 of the fly wheel 49 to rotate the latter. Since the recesses 41 within the discs 36 are arranged in opposite directions, that is the wide end of the recesses in one disc 34 are located at an end opposite the wide end of the recesses 41 of the opposite disc 36, a continuous impulse will be imparted to the fly wheel 39 in one direction. This motion is communicated through the bevel gear 43 to either one of the bevel gears 45 or 46 depending upon which are in meshing engagement and a rotary motion will thus be communicated to the shaft 12. In order to vary the ratio of rotation between the shaft 11 and 12 it is merely necessary to shift the rod 26, which motion is converted to rotary motion of the shaft 19 in the manner previously described to carry the nut 29 nearer the center of rotation of the bevel gear 14 and hence the degree of travel of the pitmen 34 will be correspondingly decreased and hence the ratio of rotation between the shafts 11 and 12 will be correspondingly decreased. In this manner a change of speed is readily obtained.

I wish to call attention to the fact that the essential feature of this invention is the mechanism mounted upon the bevel gear 14 whereby the nut 29 is moved toward or away from the center of rotation thus permitting a variation of speed. It will be obvious however that this invention may be utilized for the purpose of transmitting motion at varied rates of speed not only in automobiles, but in various other machines such as power lathes, presses or the like and in the adaptation thereof the bevel gear 13 and shaft 12 may be omitted if desired and the power applied and taken from the bevel gear 14 and shaft 35 in an obvious manner. I also wish to point out that I may employ any other means than that shown, such as the rollers 42 within the recesses for causing alternate gripping operation of the discs 36 upon the fly wheel.

While I have illustrated and described my invention with some degree of particularity, I realize that in practice various alterations therein may be made. I therefore reserve the right and privilege of changing the form of the details of construction or otherwise altering the arrangements of the correlated parts without departing from the spirit of the invention or the scope of the appended claims.

Having thus described my invention, what I claim as new and desire to secure by United States Letters Patent is:

1. In a transmission mechanism, a shaft, a fly wheel keyed to the shaft and having a pair of under cut annular surfaces, a pair of discs one mounted at each side of the fly wheel and loosely upon the shaft, a pinion carried by each disc, each disc having its periphery formed with recesses wider at one end than the other, rollers mounted in said recesses to grip the inner surface of the fly wheel upon rotation of the disc in one direction and to release the same upon the reverse rotation of the disc, a pair of sectors one engaging each of the pinions, means for rotating said sectors in opposite directions alternately, and means for varying the rate of travel of said last mentioned means.

2. In a transmission mechanism, a shaft, a fly wheel keyed to the shaft and having under cut annular surfaces, a pair of discs on each side of the fly wheel loosely mounted on the shaft, each of said discs having a pinion, a one-way clutch device cooperating with the fly wheel, a pair of sectors engaging said pinions, means for rotating said sectors in opposite direction alternately and means for varying the rate of travel of said last mentioned means.

3. In a transmission mechanism, a shaft, a fly wheel keyed to the shaft, a pair of discs loosely mounted on the shaft at each side of the fly wheel, pinions formed with the said discs, a one-way clutch device cooperating with the fly wheel, alternately driven sectors engaging said pinions, and lever operated means for varying the rate of travel of said sector.

4. In a transmission mechanism, a shaft, a fly wheel keyed to the shaft, a pair of discs loosely mounted on the shaft at each side of the fly wheel, pinions formed with said discs, a one-way clutch mechanism cooperating with the fly wheel, a stub shaft, a pair of sectors mounted on the stub shaft and engaging said pinions, pitmans connecting the sectors, and means for varying the throw of said pitmans and the rate of travel of the sectors.

5. In a transmission mechanism, a shaft, a fly wheel keyed to the shaft, a pair of discs loosely mounted on the shaft at each side of the fly wheel, pinions formed with each of said discs, a one-way clutch mechanism cooperating with the fly wheel, a stub shaft, a pair of sectors pivotally mounted on said stub shaft in constant engagement with the pinions, pitmans pivotally connected to each of said sectors and lever operated means for longitudinally adjusting said pitmans to vary the rate of travel of said sectors.

In testimony whereof I affix my signature in presence of two witnesses.

ALDO CURIONI. [L. S.]

Witnesses:
   PASQUALE CIPELLI,
   U. J. ALLISI.